United States Patent
Volpe et al.

(10) Patent No.: US 11,528,187 B1
(45) Date of Patent: Dec. 13, 2022

(54) DYNAMICALLY CONFIGURABLE NETWORKING DEVICE INTERFACES FOR DIRECTIONAL CAPACITY MODIFICATIONS

(71) Applicant: Amazon Technologies, Inc., Seattle, WA (US)

(72) Inventors: Thomas A. Volpe, Austin, TX (US); Kiran Kalkunte Seshadri, Cedar Park, TX (US); Jamie Plenderleith, Dublin (IE); Alan Michael Judge, Dublin (IE); Gianluca Grilli, Seattle, WA (US); Alaa Adel Mahdi Hayder, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 16/588,946

(22) Filed: Sep. 30, 2019

(51) Int. Cl.
*H04L 41/0816* (2022.01)
*H04L 47/76* (2022.01)
*H04L 47/24* (2022.01)
*H04L 41/0896* (2022.01)

(52) U.S. Cl.
CPC ...... *H04L 41/0816* (2013.01); *H04L 41/0896* (2013.01); *H04L 47/24* (2013.01); *H04L 47/76* (2013.01)

(58) Field of Classification Search
CPC . H04L 41/0816; H04L 47/76; H04L 41/0896; H04L 47/24
See application file for complete search history.

(56) References Cited

U.S. PATENT DOCUMENTS

| | | | |
|---|---|---|---|
| 6,721,271 B1 | 4/2004 | Beshai et al. | |
| 9,007,909 B2 | 4/2015 | Jain et al. | |
| 2005/0058149 A1 | 3/2005 | Howe | |
| 2005/0259586 A1* | 11/2005 | Hafid | H04L 47/746 370/241 |
| 2011/0164620 A1* | 7/2011 | Jinno | H04J 14/0204 370/392 |
| 2015/0188831 A1* | 7/2015 | Farmanbar | H04L 47/30 370/238 |
| 2016/0065484 A1* | 3/2016 | Suzuki | H04L 47/522 370/415 |
| 2016/0191277 A1* | 6/2016 | Li | H04L 1/0002 370/465 |
| 2017/0366467 A1* | 12/2017 | Martin | H04L 47/2433 |

* cited by examiner

*Primary Examiner* — Chae S Lee
(74) *Attorney, Agent, or Firm* — S. Scott Foster; Kowert, Hood, Munyon, Rankin & Goetzel, P.C.

(57) ABSTRACT

Directional capacity of interfaces for networking devices are dynamically modified. Network traffic utilization of one direction of a network interface may be determined. A modification to a capacity of the networking device to process network traffic in the one direction of the network may be determined. The modification may then be applied to the networking device so that subsequent network traffic is processed according to the modified capacity in the one direction of the interface.

20 Claims, 13 Drawing Sheets

DYNAMICALLY CONFIGURABLE NETWORKING DEVICE INTERFACES FOR DIRECTIONAL CAPACITY MODIFICATIONS

BACKGROUND

Network communications are foundational to the operation of many different systems and devices. Large public networks, such as the Internet, or smaller private networks, such as corporate intranets, facilitate communications between different systems or devices, from clients of services that provide storage, computing, or data delivery to hosting internal web sites or network tools accessible to a small number of users. Such networks utilize large numbers of networking devices to facilitate the fast and reliable delivery of data, network packets, from one system to another.

Leveraging the power of network communications has greatly increased the workload upon networking devices to receive, process, and send network traffic. However, network traffic may not be evenly distributed amongst networking devices. Therefore, techniques that increase the flexibility of networking devices to adjust to changing network traffic workloads in order to optimize the processing of network traffic may be desirable.

Figure 1:
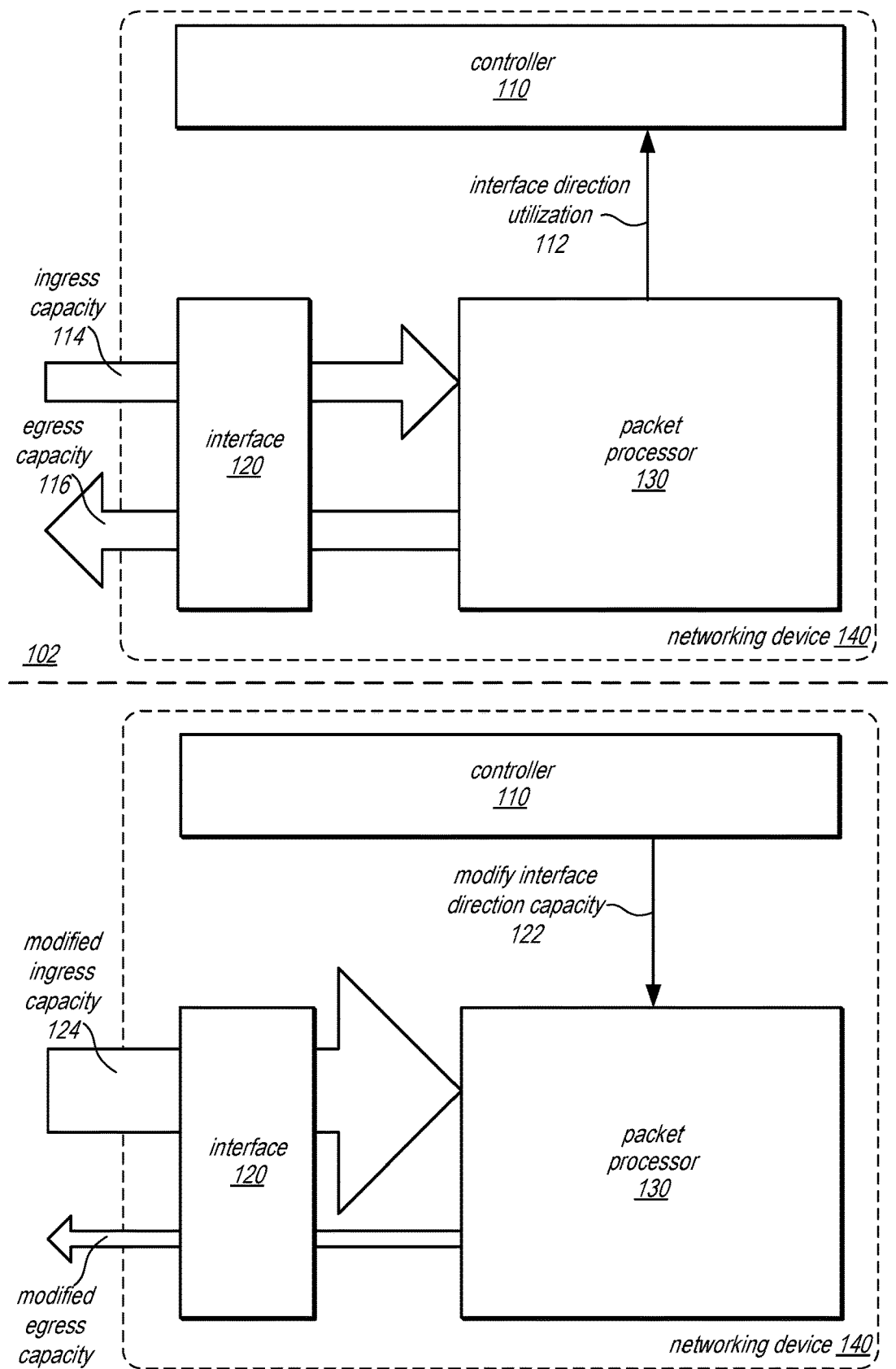
FIG. 1 illustrates a logical block diagram of dynamically modifying directional capacity of networking device interfaces, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various techniques for dynamically modifying directional capacity of networking device interfaces are described herein. Networking devices may facilitate network traffic through links or other connections (e.g., wired and/or wireless connections) established between the networking devices of a network. Duplex or other multi-directional communications may be supported on the connections so that networking device A connected to networking device B may both send and receive transmissions via the same connection. To implement a duplex connection, interfaces at connected networking devices may allocate some portion of resources to both transmitting and receiving network traffic. In this way, the performance of network traffic in either direction may not suffer.

However, in some scenarios, the amount or distribution of network traffic may change between directions of a connection. For instance, a database server, may have a fairly equal distribution of network traffic between queries and results returned for the queries during a time period (e.g., working hours) in which client applications (e.g., operated by users) are submitting a requests. When client application workloads reduce or stop at a different time period (e.g., during non-working hours), a different distribution of network traffic, such as database backup operations that are performing writes, copies, or otherwise sending data to a backup location may have a much larger amount of network traffic in one direction (e.g., to the backup location) than is being received from the same connection in the opposite direction (e.g., a backup storage location may send little communications other than periodic acknowledgments). In this scenario, and other scenarios where network traffic utilizes the capacity of one direction of network traffic more than the opposite direction on the connection, techniques for dynamically modifying directional capacity of networking device interfaces can increase the performance of the one direction workload.

FIG. 1 illustrates a logical block diagram of dynamically modifying directional capacity of networking device interfaces, according to some embodiments. A networking device, such as networking device 140 may support the transmission and receipt of network traffic in a network. Network traffic may include packets of data (e.g., datagrams) sent across a network from a source networking device (e.g., a network interface card implemented at a computer or server) to a destination networking device. A network may include many types of networking devices, such as various kinds of switches, routers, various combinations of switching and routing elements at high capacity or any other device capable of receiving, processing, and/or sending the network packets across links or other connections between the networking devices in the network.

Packet processor 130 may be implemented as part of networking device 140 to route, forward, or otherwise facilitate the communication of different devices, systems or networks via network connections to networking device 140, such as discussed below with regard to FIGS. 4 and 5. Network packets may be received at packet processor 130 via network interface 120 (e.g., Ethernet port) for processing and forwarding with respective forwarding decisions made for the network packets by packet processor 130. Interface 120 may be a duplex interface that supports communications in multiple directions along the same connection. As illustrated in FIG. 1, interface 120 may have capacity to receive and process ingress network traffic bound to networking device 140, as part of ingress capacity 114, and may have capacity to process and transmit network traffic bound to a destination networking device, as part of egress capacity 116.

Networking device 140 may implement a controller 110, which may in various embodiments, perform various management operations with respect to networking device 140, including managing interface 120 and packet processor 130. For example, as indicated in scene 102, packet processor 130 may provide indications of interface direction utilization 112 to controller 110 (e.g., X bps for ingress capacity, Y bps for egress capacity). Controller 110 may forward, summarize, or otherwise provide interface direction utilization information (with possibly utilization information for other interfaces at networking device 140—not illustrated) to a network traffic manager or other component as part of a centralized directional capacity management scheme, as discussed below with regard to FIGS. 2 and 9-10.

As illustrated in scene 104, controller 110 may modify interface direction capacity 122, according to various techniques discussed below with regard to FIGS. 5-8B and 12. For instance, if a high-level of capacity is utilized for ingress network traffic via interface 120, an increase to the ingress capacity may be made, according to some embodiments, as illustrated at 124. Capacity changes may include changes to fully or partially change the capacity of one direction of an interface (e.g., change interface capacity from 50% ingress and 50% egress to 100% ingress and 0% egress). In some embodiments, limitations on capacity changes may be implemented (e.g., at least some portion of capacity may be reserved for traffic in both directions to allow for link control protocols). In other embodiments, traffic in both directions may be able to share a communication channel that is otherwise allocated completely to one direction, utilizing transmission techniques that take advantage of different wavelengths, frequencies or time divisions for traffic in the different directions on the same channel).

Capacity changes may also implement networking device changes, such as changes that may be made to routing costs or metrics used in a routing table when making routing decisions for network traffic, in some embodiments. A networking device that modifies directional capacity of an interface may update the routing costs or metrics used by that networking device. Similar changes may be made in centralized network traffic management schemes.

Figure 10:
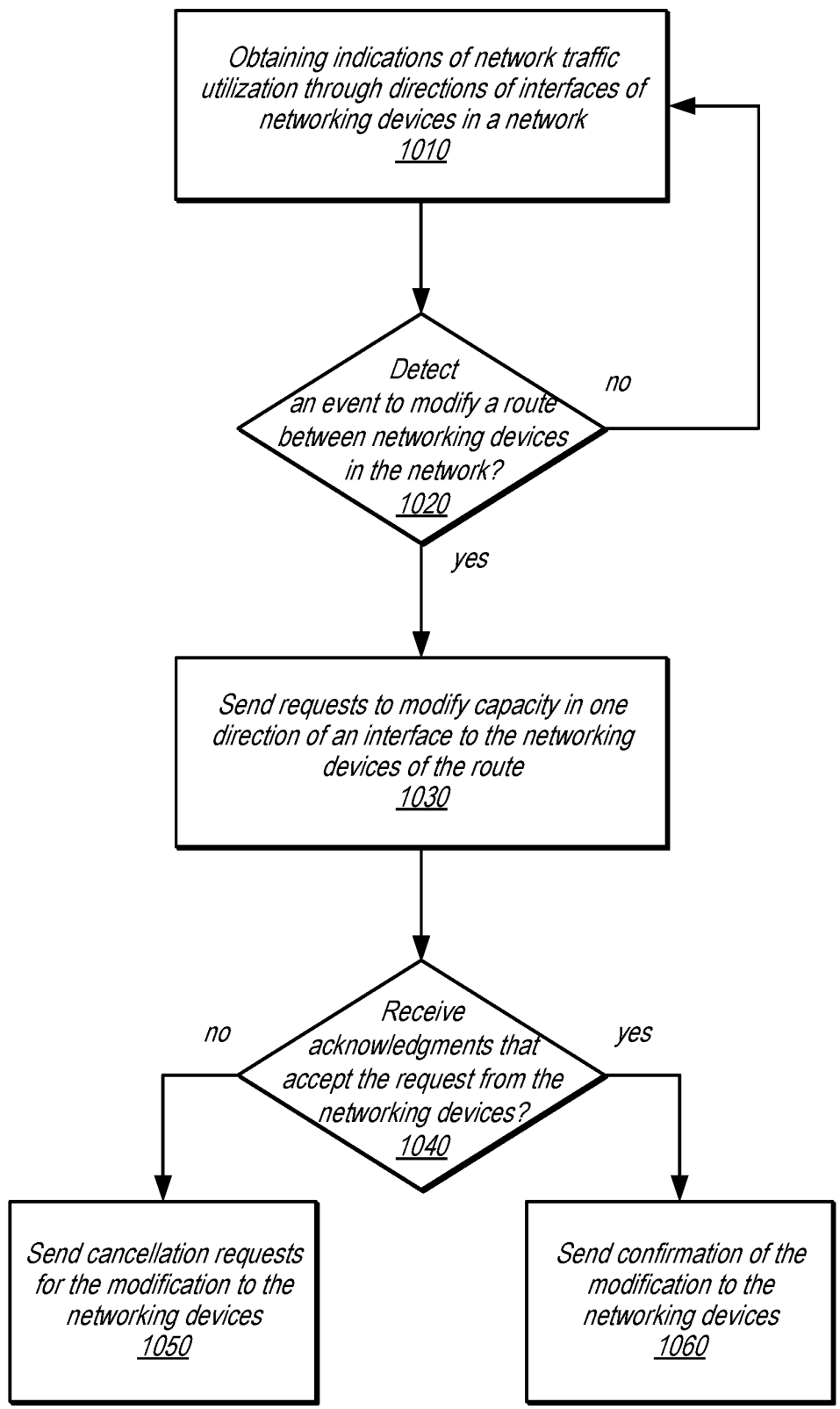
FIG. 10 is a high-level flowchart illustrating techniques for centralized monitoring and modification of directional capacity of networking device interfaces, according to some embodiments.
Figure 11:
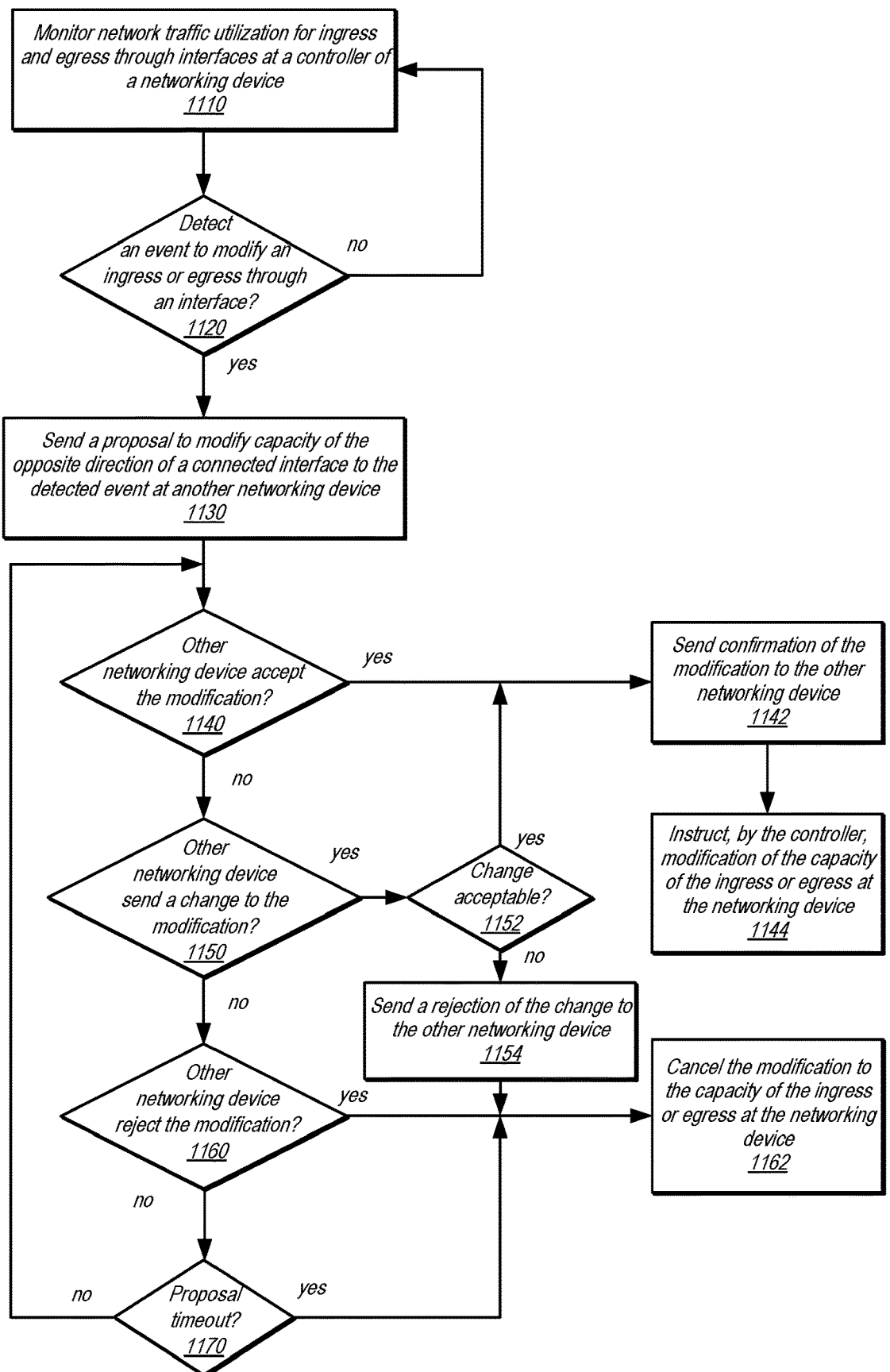
FIG. 11 is a high-level flowchart illustrating techniques for decentralized monitoring and modification of directional capacity of networking device interfaces, according to some embodiments.

Controller 110 may evaluate, monitor, or otherwise detect events that trigger the modification 122, as discussed below with regard to FIGS. 3, 9 and 11, which may implement decentralized, dynamic modifications to directional interface capacity, including receiving requests from other networking devices that are connected to networking device 140 and propose to perform modifications on the same connection with networking device (e.g., where networking device 140 receives ingress network traffic from another networking device, corresponding modifications to the egress capacity of the other networking device may be made in addition to the modified ingress capacity 124). In other embodiments, such as the centralized, dynamic modification techniques discussed in FIGS. 2 and 9-10, controller 110 may receive requests or instructions to perform the modification 122. Although illustrated as a modification to a single interface, in at least some embodiments, modifications may be specified or requested as a set of modifications made to multiple interfaces at a networking device 140, in some embodiments. In this way, a total capacity of the networking device may not be exceeded. Moreover, as discussed below with regard to FIGS. 2 and 3, modifications may be made to connected interfaces that establish a link, so that a capacity change made at an interface at one end of the link is supported by a capacity change made at the interface at the other end in the link.

Techniques for dynamically modifying directional capacity of networking device interfaces offer various performance improvements to networking devices, as well as the networks and applications that utilize communications supported by the networking devices. For example, application workloads that utilize high network bandwidth in one direction may be benefit from a centralized traffic management system that can configure the capacity of networking devices to better handle the application workloads. In another example, individual networking devices can recognize and self-configure directional capacity in order to automatically tune performance of networking devices to meet actual network traffic demands. As directional capacity can be adjusted, such changes can be reverted or further altered to respond to additional network traffic changes (e.g., reverting to a balanced distribution of directional traffic via an interface, or changing the capacity allocated to another interface at a same networking device, while lowering the modified capacity of another interface to support the change).

Please note that the previous descriptions of a controller 110, interface 120, packet processor 130, and networking device 140, as well as the various interactions discussed above are not intended to be limiting but, instead are merely provided as a logical illustration of dynamically modifying directional capacity of networking device interfaces. Different numbers of components or configuration of components may be implemented.

This specification begins with a general description of different networks implementing different management schemes for dynamically modifying directional capacity of networking device interfaces. Then, various examples of a networking device are discussed, including different components/modules, or arrangements of components/modules that may be implemented and which may receive, generate, and/or process network packets with dynamically modified directional capacity. A number of different methods and techniques to implement dynamically modifying directional capacity of networking device interfaces are then discussed, some of which are illustrated in accompanying flowcharts. Various examples are provided throughout the specification.

Figure 2:
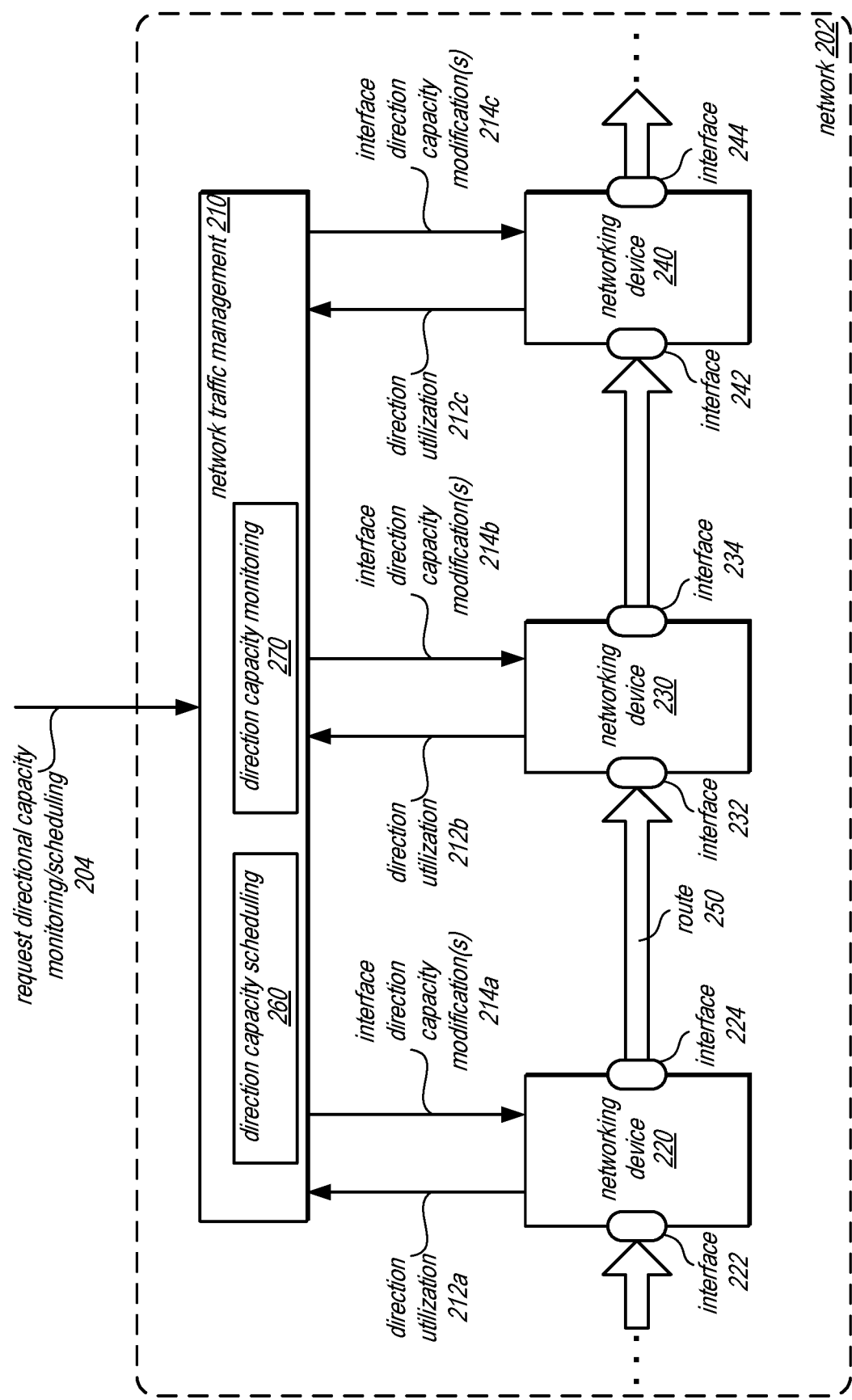
FIG. 2 is a logical block diagram illustrating a traffic manager for a network that dynamically modifies directional capacity of networking device interfaces, according to some embodiments.

FIG. 2 is a logical block diagram illustrating a traffic manager for a network that dynamically modifies directional capacity of networking device interfaces, according to some embodiments. In some embodiments, network 202 may be a provider network set up by an entity such as a company or a public sector organization to provide one or more services (such as database services, data processing services, data storage services, and/or various other types of cloud-based or network-based services) accessible via the Internet and/or other networks to clients. In such embodiments, network 202 may include numerous data centers hosting various resource pools, such as collections of physical and/or virtualized computer servers, storage devices, networking equipment and the like (e.g., computing system 2000 described below with regard to FIG. 13), needed to implement and distribute the infrastructure and services offered by the provider network by sending network traffic amongst various resources connected to network 202.

Figure 3:
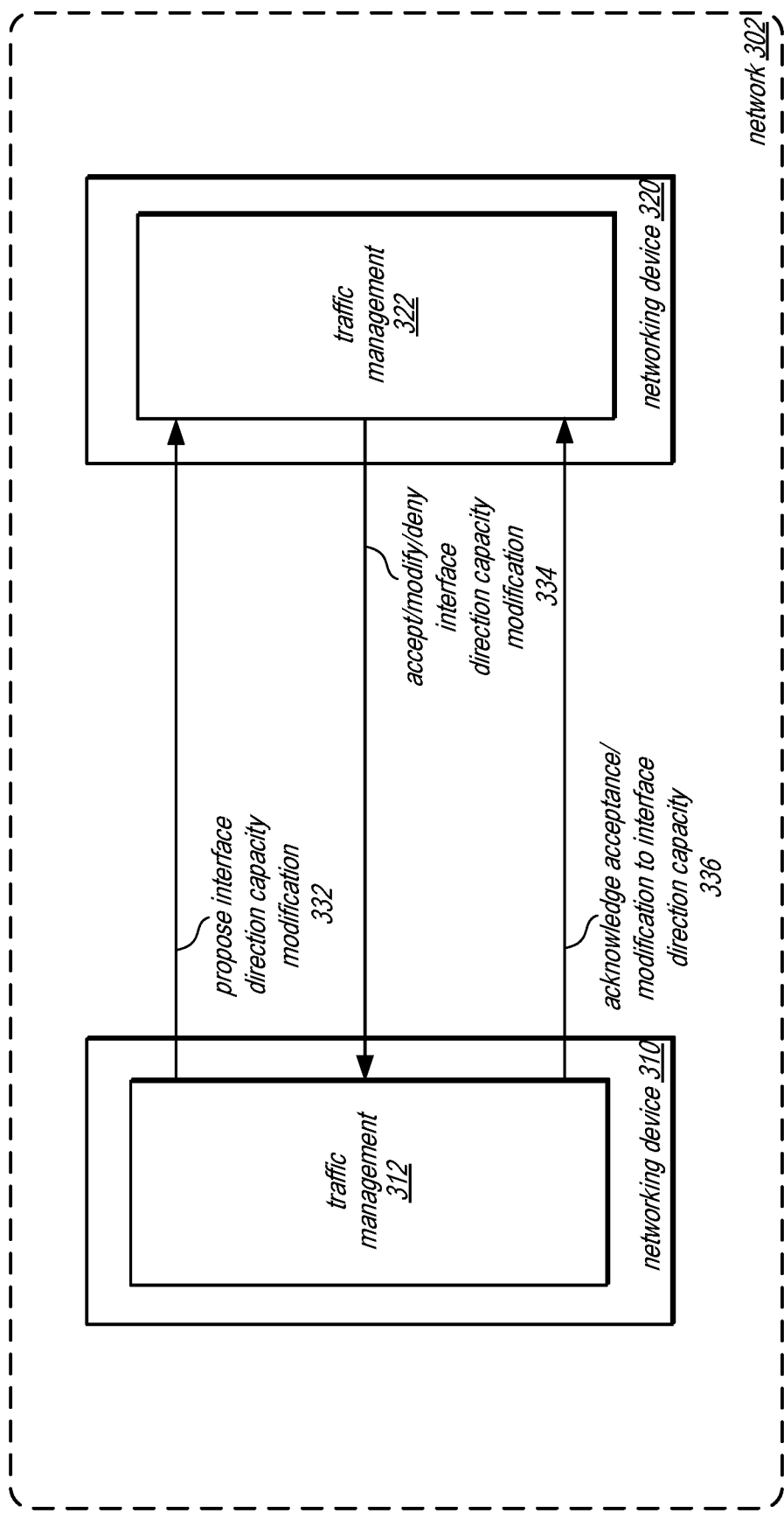
FIG. 3 is a logical block diagram illustrating a pair of networking devices dynamically modifying directional capacity of connected interfaces between the pair of networking devices, according to some embodiments.

In various embodiments, the components illustrated in FIGS. 2-3 may be implemented directly within computer hardware, as instructions directly or indirectly executable by computer hardware (e.g., a microprocessor or computer system), or using a combination of these techniques. For example, a network traffic manager 210 may be implemented by a system that includes a number of computing nodes (or simply, nodes), each of which may be similar to the computer system embodiment illustrated in FIG. 13 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Figure 13:
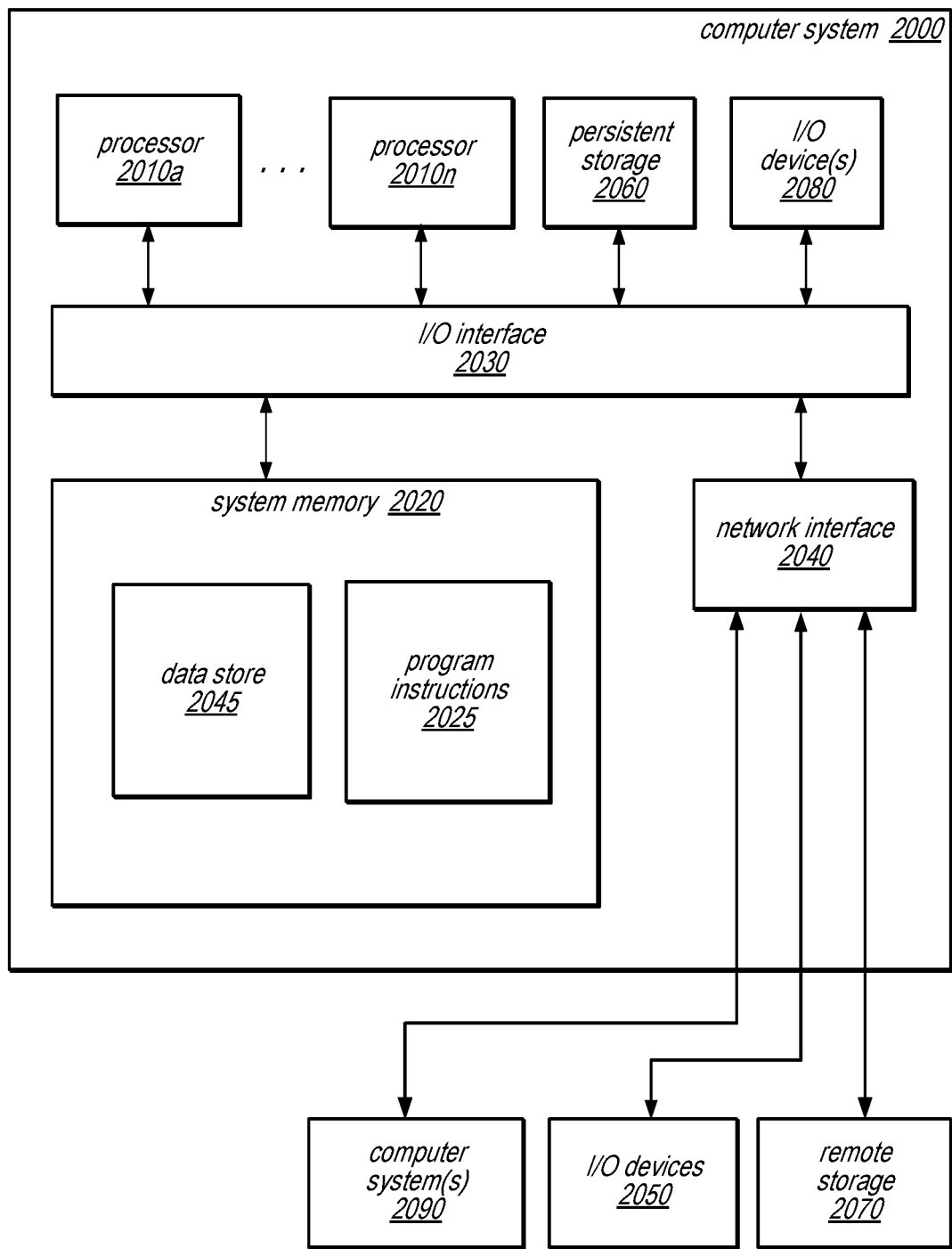
FIG. 13 is a block diagram illustrating a computer system that may implement at least a portion of systems described herein, according to some embodiments.

In various embodiments, network 202 may encompass any suitable combination of networking hardware and protocols necessary to establish network-based-based communications between servers, systems, or other devices, including computer system 2000 in FIG. 13. For example, network 202 may generally encompass the various telecommunications networks and service providers that collectively implement the Internet. Network 202 may be or include private networks such as local area networks (LANs) or wide area networks (WANs) as well as public or private wireless networks. In some embodiments, network 202 may include the networking devices (e.g., modems, routers, switches, load balancers, proxy servers, etc.) and software (e.g., protocol stacks, accounting software, firewall/security software, etc.) necessary to establish a network link between clients within and/or external to network 202.

As noted earlier, network 202 may implement various networking devices, such as networking device 220, 230 and 240, which may support network communications using connections between interfaces at the networking devices, such as interfaces 222, 224, 232, 234, 242, and 244, to provide a route 250 between a destination and source of network traffic (which may or may not be located within network 202). Network 202 may implement network traffic management 210, in some embodiments, which may perform various traffic management operations coordinated across network 202. For example, network traffic management 210 may implement various security policies or controls to prevent malicious network traffic (e.g., denial of service attacks), add or configure private or secure network communications by supporting various virtual private networking configurations, and/or handle network failure scenarios, such as updating routing information to avoid network partitions or other network failures within network 202.

In at least some embodiments, network traffic management 210 may implement a centralized scheme for dynamic modification of directional capacity of networking device interfaces. For example, networking traffic management 210 may implement a user interface (e.g., a command line interface, Graphical User Interface (GUI), such as may be implemented in a web-based console, and/or Application Programming Interfaces (APIs)) that allow for requests to configure, enable, or otherwise specify the application direction capacity scheduling 260 for network traffic and/or direction capacity monitoring 270.

For example, an application with different operating modes or conditions may experience different operating conditions, where demand peaks at predictable time periods (e.g., a media streaming or gaming service that experiences increases on nights or weekends). In such an example, the network traffic to stream media to client applications during those times may exhibit higher utilization of directional capacity of interfaces.

Such a system could utilize demand forecasting or other prediction techniques to identify high one-directional utilization time periods, and provide requests to enable increased capacity in the utilized direction for network traffic along the route (e.g., route 250). Direction capacity scheduling 260 could identify routes (e.g., via routing information maintained for network 202 or discovery techniques), like route 250, and then send requests to modify interface direction capacity, such as requests 214a, 214b, and 214c along route 250, at one of the predicted load times. In this way, capacity could be proactively procured along the direction of route 250 without waiting to detect a need for such capacity.

In another example, a request 204 could enable direction capacity monitoring 270 for a specified application, user account, class or type of network traffic, or other information that can identify a route, like route 250 (e.g. by identifying a data file transfer about to commence). In some embodiments, direction capacity monitoring 270 may be implemented automatically without opting-in or enabling for specific network traffic (e.g., as a general network health or management feature). Direction capacity monitoring 270 may collect indications of direction utilization, such as direction utilization 212a, 212b, and 212c, for different interfaces of different networking devices. If the direction utilization indicates an unequal distribution (e.g., greater than a threshold difference, such as a 2 to 1 difference along route 250) between traffic along route 250 and traffic going in the opposite direction of route 250, then requests to modify interface direction capacity, such as requests 214a, 214b, and 214c, may be sent.

In some embodiments, modification decisions by network traffic management 210 (based on direction capacity scheduling 260 or direction capacity monitoring 270) may account for aggregate directional utilization information across portions of network 202 larger than an individual route (e.g., larger than route 250) up to considering the directional traffic utilization of the entirety of network 202. For instance, if direction capacity monitoring 270 detects an unequal distribution for a route, as discussed above, then network traffic management may also consider whether spare capacity exists in the larger portion of network 202 (e.g., if additional ingress directional utilization is to be instructed a check as to whether spare egress capacity is available within the larger portion of network 202 support the diversion of capacity to ingress processing). In some embodiments modifications to support one route, such as interface direction capacity modifications 214a, 214b, and 214c for route 250, may also incur or cause other modifications to other interfaces not illustrated on networking devices 220, 230, and 240, and/or modifications to interfaces on other networking devices of network 202 not illustrated.

In some embodiments, the various interface direction capacity modifications 214 may be different between interfaces and/or devices. For example, an increase to the ingress capacity at interface 222 may not be the same as an increase to ingress capacity 232. Similarly, an increase to egress capacity at interface 244 may be less than an increase to ingress capacity at interface 242.

As discussed below with regard to FIG. 10, in some embodiments, networking devices 230, 240, and/or 250 may be unable to comply with the modification request, and network traffic management 210 may revert or propose different modifications to an interface directional capacity. In this way, a networking device experiencing a load yet unknown to network traffic management 210 may be able to prevent a modification being instructed which could be detrimental to other network traffic at the networking device.

FIG. 3 is a logical block diagram illustrating a pair of networking devices dynamically modifying directional capacity of connected interfaces between the pair of networking devices, according to some embodiments. Network 302, which may be similar to the various examples of network 202 discussed above with regard to FIG. 2. may include networking devices 310 and 320. Instead of (or in addition to) a centralized scheme for dynamically allocating directional capacity for networking interfaces, FIG. 3 illustrates networking devices that are capable of automatically performing modifications to interface directional capacity without centralized coordination.

For example, in some embodiments, a controller (or other hardware or software component) may implement traffic management, such as traffic management 312 and 322 which may perform various operations to handle network traffic management operations. Traffic management may monitor the utilization of the ingress and egress of network traffic for different interfaces (e.g., for different respective Ethernet ports) across a networking device. A utilization threshold, or other criteria, may be implemented so that if utilization of a direction satisfies capacity modification event criteria to increase or decrease capacity (e.g., to increase capacity in a direction when direction utilization is above 80% for 3 minutes), in some embodiments.

As changes in direction capacity allocations may impact connected networking devices, a capacity adjustment protocol (e.g., implemented as a new protocol or an extension of an existing protocol, such as Link Aggregation Control Protocol (LACP)) for an interface direction may be implemented as illustrated in FIG. 3. Although two networking devices are illustrated, such proposals could be made to multiple networking devices in some scenarios. Traffic management 312 at networking device 310 may detect a modification event for a direction of an interface at networking device 310 that is connected to an interface at networking device 320. As illustrated in the techniques below with regard to FIG. 11, traffic management 312 may attempt to obtain agreement to a modification made to direction capacity at networking device 310 from networking device 320 before performing the modification. Thus, a proposal request identifying the interface direction and corresponding change in capacity (e.g., an increase from 10 Gbps to 19 Gbps) may be proposed. Interface direction capacity management 322 may be able to determine whether such an increase can supported (and/or whether a corresponding change can be supported to accommodate the change) the connected interface at networking device 320. Interface direction capacity management 322 may send an acceptance, modification, or denial 334 to the proposal. A modification response 334 may indicate a different change (e.g., an increase to 15 Gbps instead of 19 Gbps). As discussed below with regard to FIGS. 10 and 11, different criteria for accepting or rejecting a proposal or modification to a proposal may be applied.

When the response is received, in some instances traffic management 312 may confirm through an acknowledgement that the modification to interface direction capacity can proceed (or the modified modification can proceed).

Figure 4:
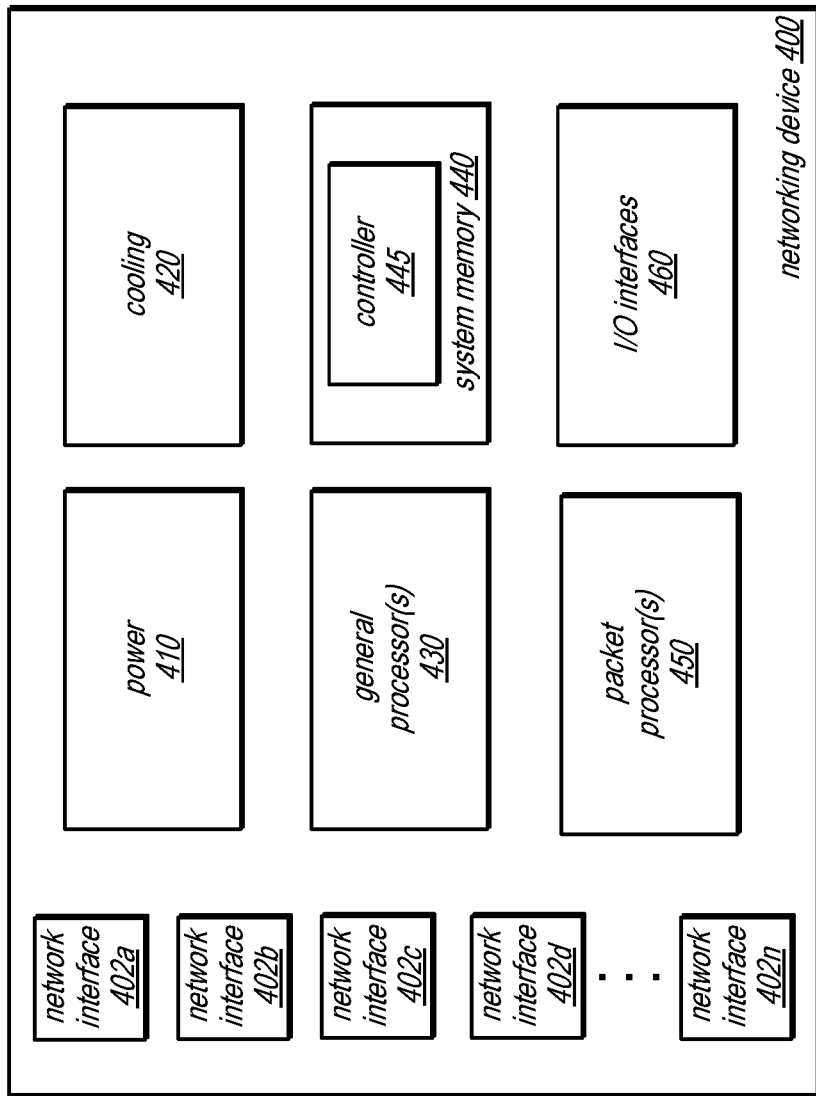
FIG. 4 is a logical block diagram illustrating a networking device with adjustable directional capacity of network interfaces, according to some embodiments.

FIG. 4 is a logical block diagram illustrating a networking device with adjustable directional capacity of network interfaces, according to some embodiments. Networking device 400 may be a networking device configured to route, forward, or otherwise facilitate the communication of different devices, systems or networks via network connections to the networking device. A networking device may provide electrical and/or optical network connections. Networking devices may operate utilizing data included in different OSI layers, such as layers 2 and 3 to make forwarding determinations (e.g., to send a network packet received from one source connected to the switch to another source connected to the switch). Please note that networking devices, such as a switch, in some contexts (e.g., when discussing layer 3 data) may be considered a type of router. Networking devices may also provide other services when facilitating communications, such as implementing network firewalls, network intrusion detection, and/or collecting metrics for performance analysis.

In at least some embodiments, networking device 400 may implement multiple network interfaces 402, which correspond to physical connections of different communication lines (e.g., twisted pair cables, coaxial cables, or fiber optic cables) connected to corresponding network interface ports or through a module or component that is inserted into a physical port with a simpler electrical interface (e.g., Small Form-Factor Pluggable (SFP) or Quad Small Form-Factor Pluggable (QSFP)). Network interfaces 402 may provide for different types, speeds, or other formats of network communication. For example, network interfaces 402 may provide different ports for 10 Gigabit, 40 Gigabit, or 100 Gigabit Ethernet cables. Many ports support multiple speeds, such as both 10 Gigabit and 100 Gigabit Ethernet connections.

Power 410 may be one or more power supplies that provide electricity to the various electrical components that draw upon power to perform operations (e.g., cooling 420, general processor(s) 430, system memory 440, packet processor(s) 450, and/or I/O interfaces 460. Cooling 420 may be one or more fan units implemented to circulate air and draw heat out of networking device 400.

Networking device 400 may include general processor(s) 430 which may include multiple cores (and which may be single or multi-threaded) coupled to a system memory 440 via an input/output (I/O) interface 460. Networking device 400 may be a uniprocessor system including one processor 430, or a multiprocessor system including several processors 430 (e.g., two, four, eight, or another suitable number). General processors 430 may be any suitable processors capable of executing instructions. For example, in various embodiments, processors 430 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 430 may commonly, but not necessarily, implement the same ISA.

Networking device 400 includes one or more system memories 440 that are configured to store program instructions and data accessible by processor(s) 430. In various embodiments, system memories 440 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 440 may contain program instructions that are executable by processor(s) 430 to implement various management functions and interfaces, such as controller 445, for networking device 400. In various embodiments, program instructions may be encoded in platform native binary, any interpreted language such as Java™ byte-code, or in any other language such as C/C++, Java™, etc., or in any combination thereof.

In some embodiments, program instructions in system memory 440 may include instructions executable to implement an operating system (not shown), which may be any of various operating systems, custom or off the shelf operating systems. Any or all of program instructions may be provided as a computer program product, or software, that may include a non-transitory computer-readable storage medium having stored thereon instructions, which may be used to program a computer system (or other electronic devices) to perform a process according to various embodiments. Program instructions in system memory 440 may also implement a controller 445 that is configured to interface with packet processor(s) 450, as noted above. For example, a controller 450 may be configured to program memory devices with new or additional information (e.g., update next hop tables, pointer tables, action tables, insert or remove forwarding routes, etc.). A controller may also perform various instructions or reconfigurations to modify directional interface capacity, as discussed below.

A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g., SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 400 may implement one or multiple I/O interface(s) 460 to provide access to networking device 400 (e.g., to perform various switch management operations). In one embodiment, I/O interfaces 460 may be configured to coordinate I/O traffic between processor 430, system memory 445, packet processor(s) 450, and any peripheral devices in the system. In some embodiments, I/O interfaces 460 may perform any necessary protocol, timing or other data transformations to convert data signals from one component (e.g., system memory 445) into a format suitable for use by another component (e.g., processor 430). In some embodiments, I/O interfaces 460 may include support for devices attached through various types of peripheral buses, such as a variant of the Peripheral Component Interconnect (PCI) bus standard or the Universal Serial Bus (USB) standard, for example. In some embodiments, the functions of I/O interfaces 460 may be split into two or more separate components, such as a north bridge and a south bridge, for example. Also, in some embodiments, some or all of the functionality of I/O interfaces 460, such as an interface to system memory 440, may be incorporated directly into processors 430 or 450.

As noted in FIG. 4, one or multiple packet processors 450 may be implemented to process data received via network interface(s) 402 at networking device 400. Packet processor(s) 450 may be implemented as dedicated hardware to perform various stages of packet processing for networking device 400. For example, packet processor(s) 450 may be implemented as an application specific integrated circuit (ASIC), field programmable gate array (FPGA), system-on-a-chip (SoC), or other dedicated circuitry that performs packet processing. Packet processor(s) 450 may also be implemented as a software-based packet processing pipeline to perform various stages of packet processing for networking device 400 (e.g., via program instructions executing on one or more general processors 430). Packet processor(s) 450 may be assigned to one or multiple network interface(s) 402, performing dedicated processing of network data received via the assigned network interface(s) 402.

Figure 5:
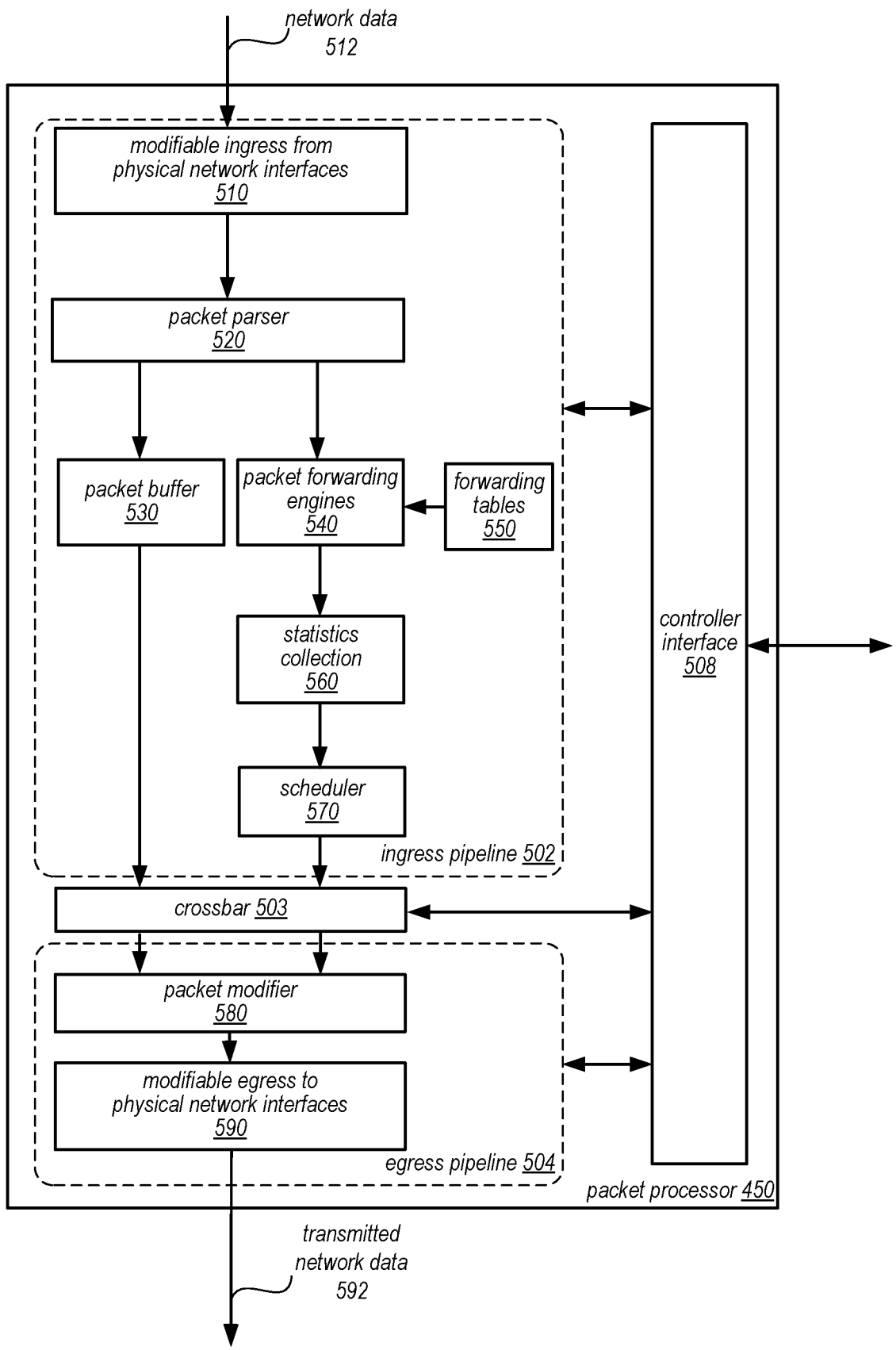
FIG. 5 is a logical block diagram illustrating a packet processor that implements ingress and egress to network interfaces with adjustable directional capacity, according to some embodiments.

FIG. 5 is a logical block diagram illustrating a packet processor that implements ingress and egress to network interfaces with adjustable directional capacity, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 400 in FIG. 4). Therefore, the term "packet processor" has been used herein to prevent confusion when referring to dedicated hardware for performing packet forwarding.

Packet processor 450 may implement multiple processing pipelines to output a processed network packet. For example, as illustrated in FIG. 5, ingress pipeline 502 and egress pipeline 504 may be implemented to provide forwarding of network packets as part of the data plane so that forwarding may be performed without software-based techniques, in some embodiments. For example, ingress pipeline 502 may include different components, units, or stages, such as an ingress unit from a physical network interface 510, a packet parser 520, a packet generator 524, a burst absorption buffer 522, a packet buffer 530, packet forwarding engines 540, statistics collection 560, and scheduler 570. Ingress pipeline 502 may also access forwarding tables 550 and other packet routing information. Egress pipeline 504 may include a packet modifier 580 with access to other packet modification data, and an egress unit to physical network interface 590. Packet processor 450 may implement a controller interface 508 to communicate with a controller implemented on general processors(s) 430.

As data is received from network interfaces, ingress unit 510, as discussed in more detail below with regard to FIG. 6, may provide a Physical Layer (PHY) interface, Physical Coding Sub-layer (PCS), and Ethernet Media Access Control (MAC) layer interface. These interfaces may evaluate a stream of network data 512 (e.g., bit stream) received at packet processor 450 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 402. The PHY layer may implement different techniques dependent on the speed or type of network interface configured (e.g., Ethernet 10BASE-T, 100BASE-TX, and 2000BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 520 may receive a network packet from ingress 510 and separate the packet header from the packet payload. The payload of the packet may be stored in packet buffer 530. Packet parser 520 may parse the packet header to determine and/or extract data for making a forwarding decision for the packet. For example, packet parser 520 may extract different layer headers (e.g., L2, L3, and L4 headers) included in an Internet Protocol (IP) version 4 packet, such as the source MAC address, the destination MAC address, the source IP address, the destination IP address, and port numbers. The extracted metadata may then be utilized to perform lookups to make forwarding decisions at packet forwarding engines 540. In some embodiments, packet parser 520 may determine different hash key values to determine an entry in pointer tables in different destination resolution stages (e.g., a tunnel initiation stage, multipath stage, or link aggregation stage) from various packet header fields (e.g., fields from layers 1, 2, 3, and 4 of the network packet and bits from the UDF) either for received network packets or network packets generated by packet processor 450, in some embodiments. Hash key values generated for a network packet can be generated for a specific type of network packet (e.g., IP or MPLS) and may be generated according to one of many different hash functions (e.g., CRC16-CITT and CRC16-IBM).

Packet forwarding engines 540 may access data stored in forwarding tables 550 to make forwarding and tunneling decisions for the network packet based on information in the packet header (e.g., including source and destination addresses) extracted by packet parser 520. For example, packet forwarding engines 540 may perform lookups for data in layer 2 (L2) portions of the packet to perform L2 forwarding. Similarly, packet forwarding engines 540 may also perform lookups for data in layer 3 (L3) portions of the packet to perform L3 forwarding, in some embodiments. For example, internet protocol (IP) headers for the packet may be evaluated with respect to entries in tables, such as a routing or next hop table, to determine forwarding to be performed. In at least some embodiments, packet forwarding engines 540 may implement one or more destination resolutions stages (e.g., as part of a destination resolution pipeline) to determine forwarding decisions for network packets. For example, various destination resolution stages may include such as a tunnel initiation stage, multipath stage, multiprotocol label switching (MPLS) outer label stage, next hop address stage, fast re-route stage, and link aggregation stage. As packet forwarding engines 540 make forwarding decisions about the packet (e.g., for L2, L3 and/or tunneling), the decisions are maintained as packet metadata. The packet metadata may be provided to scheduler 570 for scheduling determinations.

As discussed above, forwarding tables 550 may be implemented in one or multiple storage devices, such as various memory devices (e.g., a CAM, such as a TCAM, and/or random access memory, such as SRAM) to store table data for performing different routing decisions. Tables may include a VLAN table, MAC address table, routing table, adjacency table, next hop table, tunnel start table, tunnel termination table, and/or actions table. Each of these different tables may be utilized to retrieve or determine packet forwarding decisions, tunneling decisions, and associated modifications that may need to be made to network packets.

In at least some embodiments, ingress pipeline 502 may implement statistics collection 560. Statistics collection 560 may collect statistics based on the network packets processed through ingress pipeline 502. For example, various counters may be maintained for events occurring during processing by packet forwarding engines 540 (e.g., such as forwarding table 550 hits including VLAN table, MAC address table, routing table, adjacency table, next hop table, tunnel start table, tunnel termination table, and/or actions table). Statistics collection 560 may also collect statistics and information concerning traffic flow and network visibility through packet processor 450, for example, by detecting, measuring, and exporting flow cache entries for large traffic flows, by sampling, aggregating, and exporting snippets (e.g., 128 bytes) from network packets from small traffic flows, and/or determining the number of unique traffic flows. In at least some embodiments, statistics collection 560 may provide statistic packets (or information to generate statistics packets that encapsulate some of the collected statistics) to forward as network packets generated by packet processor 450. Statistics collection 560 may also be accessible to a controller via controller interface 508 to provide the collected statistics and other information based on the packets processed through ingress pipeline 502.

Scheduler 570 may control the buffering of packets and scheduling of operations within packet processor 450. For example, scheduler 570 may implement a memory management unit to allocate available memory segments in packet buffer 530 to store packets to be buffered. If a packet needs to be buffered (e.g., because the egress interface is congested), scheduler 570 may store the packet in a private pool of memory assigned to a particular physical interface port for the packet or shared pools of memory to store packets (e.g., if the private pool of memory is full). Scheduler 570 may also implement a memory management unit to dequeue packets from packet buffer 530 for final processing and egress. Scheduler 570 may provide the appropriate metadata for a packet to modifier 580. In some embodiments, packets from packet buffer 530 and packet metadata from scheduler 570 may be moved from ingress pipeline 502 to egress pipeline 504 via a crossbar 503. Crossbar 503 may, for example, be implemented by one or more destination rings to transmit a network packet from the ingress pipeline 502 via egress pipeline 504 to a desired destination port.

Controller interface 508 may implement a peripheral component interface (PCI) based interface, such as PCIe, to facilitate communication between packet processor 450 and general processor(s) 430 and system memory 440. As part of the PCI-based interface, controller interface may implement a parallel input/output (PIO) interface to allow a controller to read and write to various components of packet processor 450, including requests to adjust performance of various stages to increase or decrease ingress or egress capacity for a network interface. Controller interface 508 may also implement a direct memory access (DMA) engine to perform DMA writes and reads to system memory 440 via a DMA channel.

Network packets that have passed through ingress pipeline 502 may be scheduled or released from packet buffer 530 for modification, reassembly and egress as part of egress pipeline 504. Packet modifier 580 may be implemented to modify packet headers based on the routing decisions indicated in the packet metadata determined by packet forwarding engines 540. For example, if tunneling is enabled for a packet, packet modifier 580 may create and insert the appropriate tunnel header in order to encapsulate at least a portion of the packet to implement a tunneling protocol. Packet modifier 580 may also perform modifications to other data in the packet header. Once the modified packet has been reassembled, egress unit to physical network interface 590 may utilize the physical layer (PHY) interface and the Ethernet Media Access Control (MAC) layer interface to transmit network packets as network data 592 via the appropriate physical connection (e.g., coaxial, twisted pair, or optical cable), again as discussed below with regard to FIG. 6.

Various techniques for implementing networking interfaces with adjustable directional capacity are described herein. Some techniques may rely upon different combinations of hardware and/or software to make adjustments to directional capacity. One example of hardware techniques that support adjustable direction capacity is discussed in FIG. 6.

Figure 6:
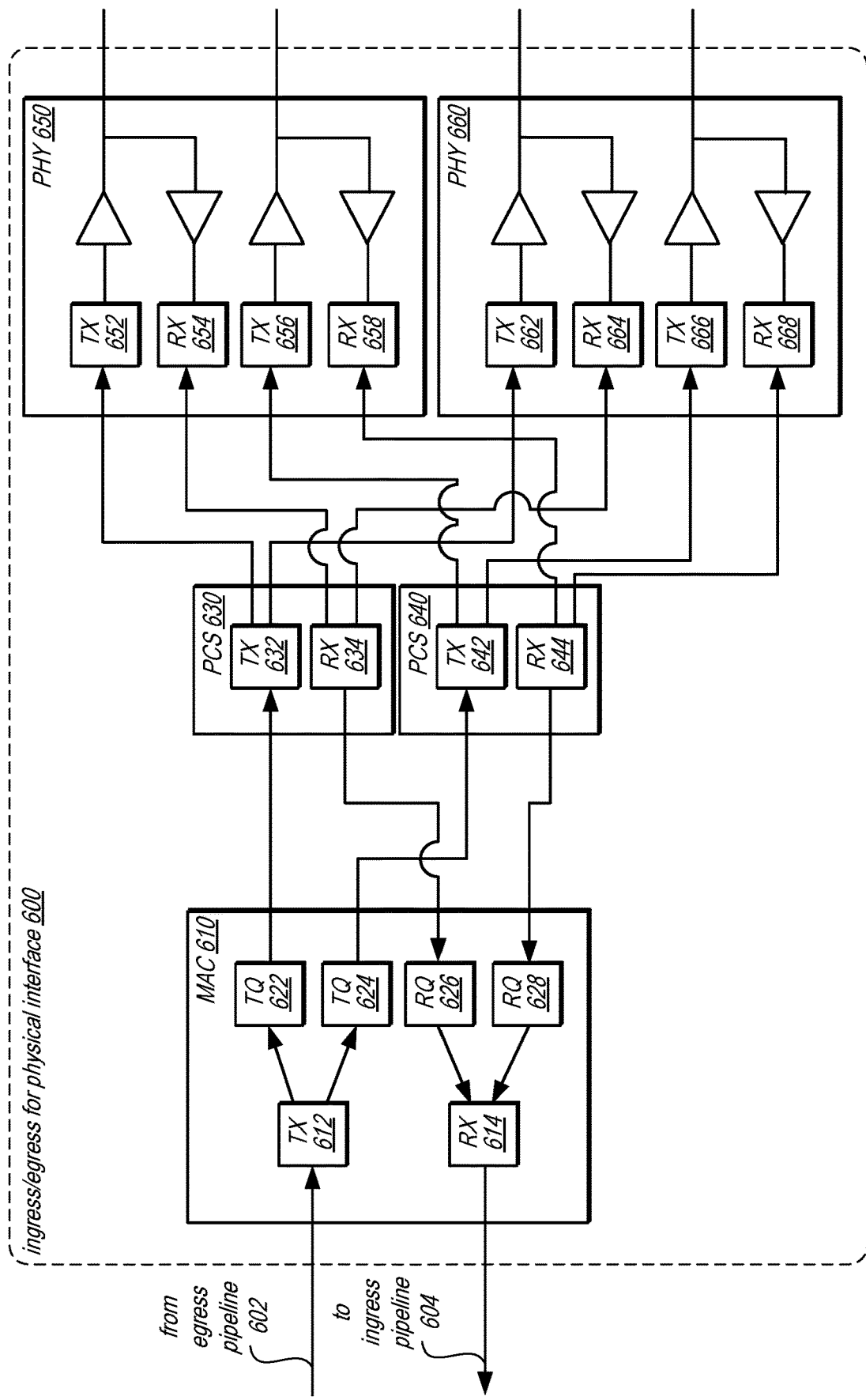
FIG. 6 is a logical block diagram illustrating ingress and egress to network interfaces with adjustable directional capacity, according to some embodiments.

FIG. 6 is a logical block diagram illustrating ingress and egress to network interfaces with adjustable directional capacity, according to some embodiments. Ingress/egress for physical interface 600 may present to the other portions of packet processing pipeline as a single interface (e.g., as a single port)—although in the illustrated example two physical layer (PHYs) 650 and 660 are implemented. Although the modifiable ingress 510 and modifiable egress 590 are illustrated as separate stages in FIG. 5, a single component 600 utilizing features illustrated in FIG. 6 may implement the modifiable ingress 510 and modifiable egress 590 in FIG. 5, in some embodiments. Ingress/egress for physical interface 600 may implement a media access control (MAC) component 610, which may receive or otherwise accept the output from egress pipeline 602 at transmitter (TX) 612. To increase adjustable transmission capacity, multiple transmission queues may receive the output of TX 612, such as transmission queue 622 and transmission queue 624. Similarly, MAC 610 may transmit or otherwise send output to ingress pipeline 604 from a receiver (RX) 614, which may pull from different receiver queues (RQ) 626 and 628, increasing the adjustable receive capacity.

Ingress/egress for physical interface 600 may implement multiple PCS components to increase capacity, such as PCS 630 and PCS 640. Each PCS may implement a corresponding transmitter and receiver, such as TX 632 and RX 634 for PCS 630 and TX 642 and RX 644 for PCS 640, in some embodiments. Ingress/egress for physical interface 600 may also implement multiple PHYs, such as PHY 650 and 660, in some embodiments. Each PHY may implement multiple pairs of transmitters (with respective buffers represented by the triangles) and receivers for multiple communication channels to provide respective outputs to or inputs from transmitters and receivers at the PCS components, increasing available capacity to an identified direction. For instance, PHY 650 may implement TX 652 and RX 654 for a first communication channel and TX 656 and RX 658 for a second communication channel, which may correspondingly connected to differ PCS transmitters and receivers (e.g., TX 652 on PHY 650 receives output from TX 632 of PCS 630 and TX 656 on PHY 650 receives output from TX642 of PCS 640). Likewise, PHY 660 may implement TX 662 and RX 664 for a first communication channel and TX 656 and RX 658 for a second communication channel, which may correspondingly connected to differ PCS transmitters and receivers (e.g., TX 662 on PHY 660 receives output from TX 632 of PCS 630 and TX 666 on PHY 660 receives output from TX 642 of PCS 640).

As illustrated in FIG. 6, each communication channel can be utilized for either receiving or transmitting data. Thus, in various embodiments, ingress/egress for physical interface 600 may offer different combinations of directional capacities that can be implemented utilizing the additional transmitter and receiver features. For example, suppose each PHY 650 and 660 supported 50 Gigabytes per second (Gbps), with each PCS 630 and 640 supporting 100 Gbps and MAC 610 supporting 200 Gbps. Such supported features could allow for the directional capacity for ingress/egress for physical interface 600 to allocate 200 Gbps of capacity between the two directions (e.g., 150 Gbps for egress and 50 Gbps for ingress, or 50 Gbps for egress and 150 Gbps for egress). In some embodiments, PHYs could be variable rate and thus could be allocated to ingress or egress processing in different increments (e.g., to implement a modification of 190 Gbps for egress and 10 Gbps for ingress). some embodiments, a controller, such as controller 445 may write to or otherwise program control features, such as control status registers in ingress/egress for physical interface 600 to identify the allocated ingress and egress capacity (e.g., by specify the pull rates from various queues in MAC 610, for instance). For example, each PHY can operate with 1 transmit channel and 1 receive channel, 2 transmit channel, or 2 receive channel. The controller can change the direction of the communication channels, such as a change from transmit to receive in a PHY.

FIG. 6 illustrates a layout which may be implemented using different communication mediums. For instance, electrical communication channels at PHYs 650 and 660 may be implemented in some embodiments, while in other embodiments an optical communication channel at PHYs 650 and 660 may be implemented. In some embodiments, complex physical links implemented by PHYs 650 and 660, such as an optical link or an active cable, may implement features so that lane directions can be changed. For instance, a signaling mechanism may be implemented to change a lane direction on a PHY. Examples of such signaling mechanisms may include bidirection retimers for electrical interfaces or additional lasers or photo detectors for optical interfaces.

Figure 7A:
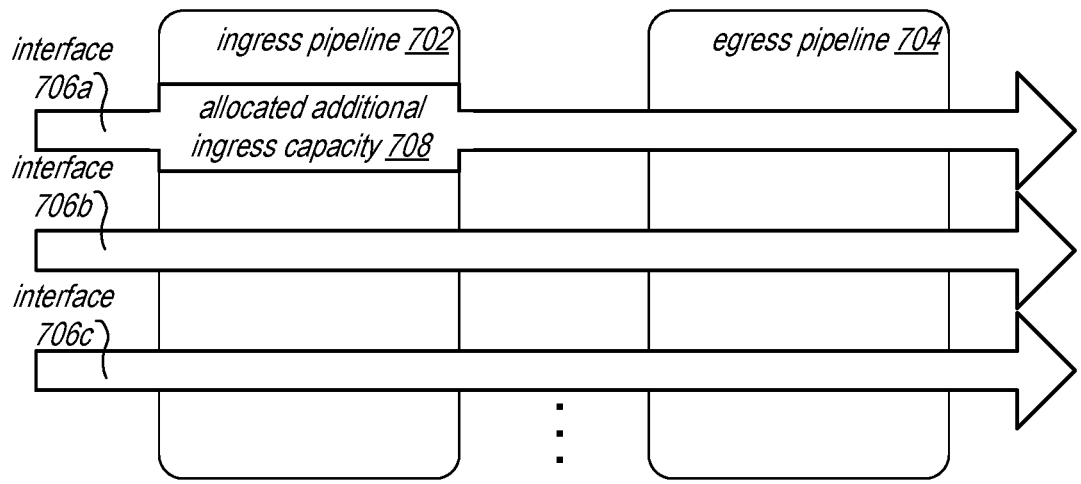
FIGS. 7A-7B are logical block diagrams illustrating different allocations of ingress and egress capacity of an interface at a networking device, according to some embodiments.

Different allocation schemes for adjusting capacity for a direction of an interface may be implemented, which may leverage hardware capacities discussed above in FIG. 6. In other embodiments, other hardware or configuration adjustments may be utilized. For example, ingress or egress pipelines may implement additional processing capacity for interfaces that utilize the respective pipelines, which are not initially allocated. For example, FIG. 7A illustrates an example adjustment for a direction for interfaces 706a, 706b, and 706c across ingress pipeline 702 and 704.

In the illustrated example, ingress pipeline 702 may have additional ingress capacity which it may allocate (as indicated 708) to a network interface, like network interface 706. Such additional capacity may be implemented in various ways. For instance, the frequency or clock cycle of ingress pipeline 702 may be increasable to allow for accepting extra traffic via interface 706a without a latency impact to unmodified interfaces 706b and 706c (e.g., interface 706a may get extra turns to put traffic into ingress pipeline 702 than interfaces 706b and 706c, but because ingress pipeline 702 performs the processing of traffic faster the times for traffic 706b and 706c are still fast enough to minimize latency impact to acceptable levels).

In another example, ingress pipeline 702 may have additional width in various processing stages (e.g., where two packets can be processed in parallel), which may be utilized when accepting traffic from interface 706a—but not from interface 706b and 706c. In this way, the additional ingress pipeline capacity can provide for an increased capacity for directional processing from interface 706a.

Figure 7B:
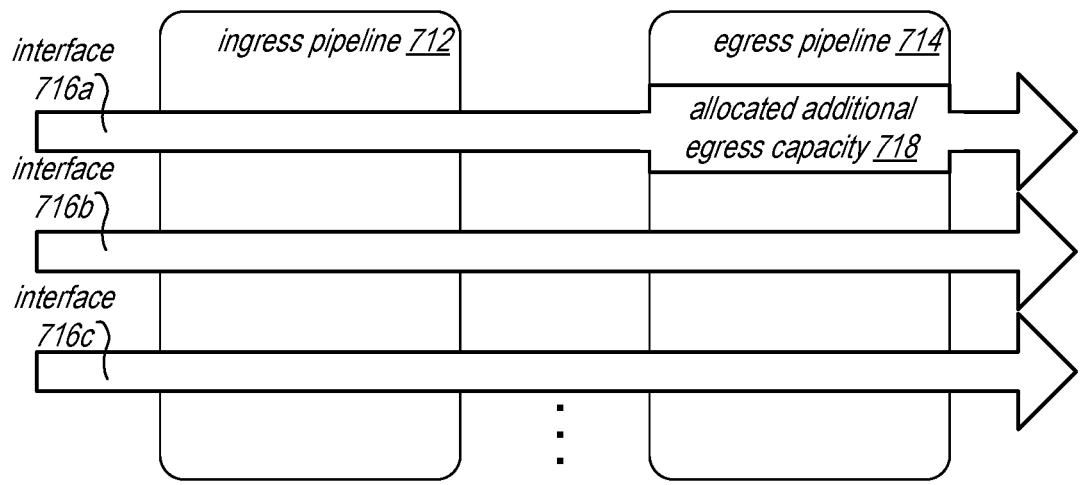

FIG. 7B illustrates an example adjustment for a direction for interfaces 716a, 716b, and 716c across ingress pipeline 712 and 714. Egress pipeline 714 may be capable of additional egress capacity than is initially allocated (e.g., according to the techniques discussed above with regard to FIG. 7A). Therefore interface 716a, for instance, can have additional egress capacity allocated 718, in some embodiments.

Figure 8A:
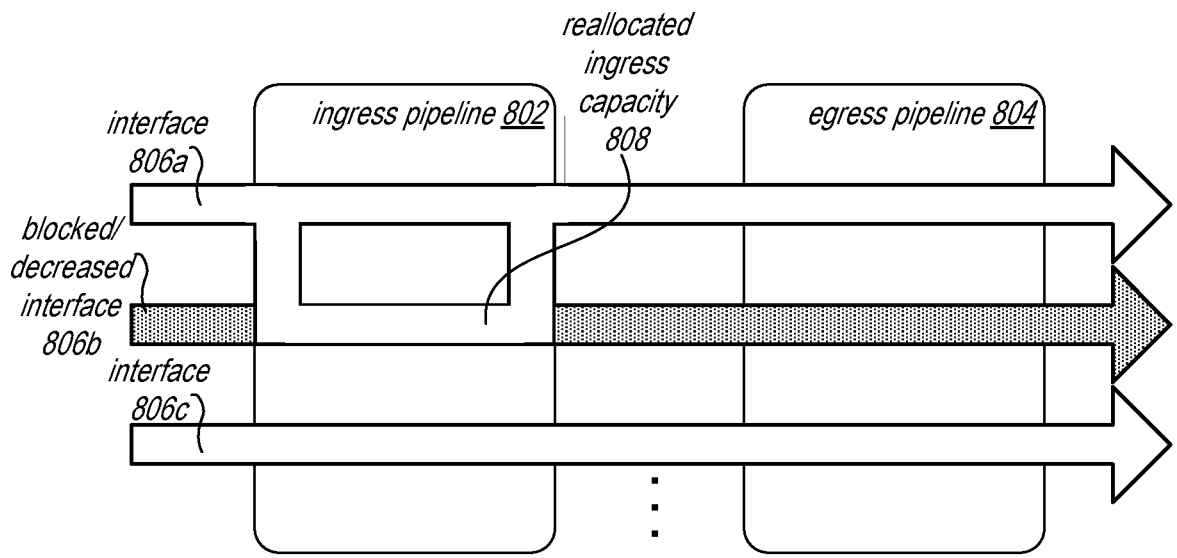
FIGS. 8A-8B are logical block diagrams illustrating different allocations of ingress and egress capacity of an interface at a networking device, according to some embodiments.
Figure 8B:
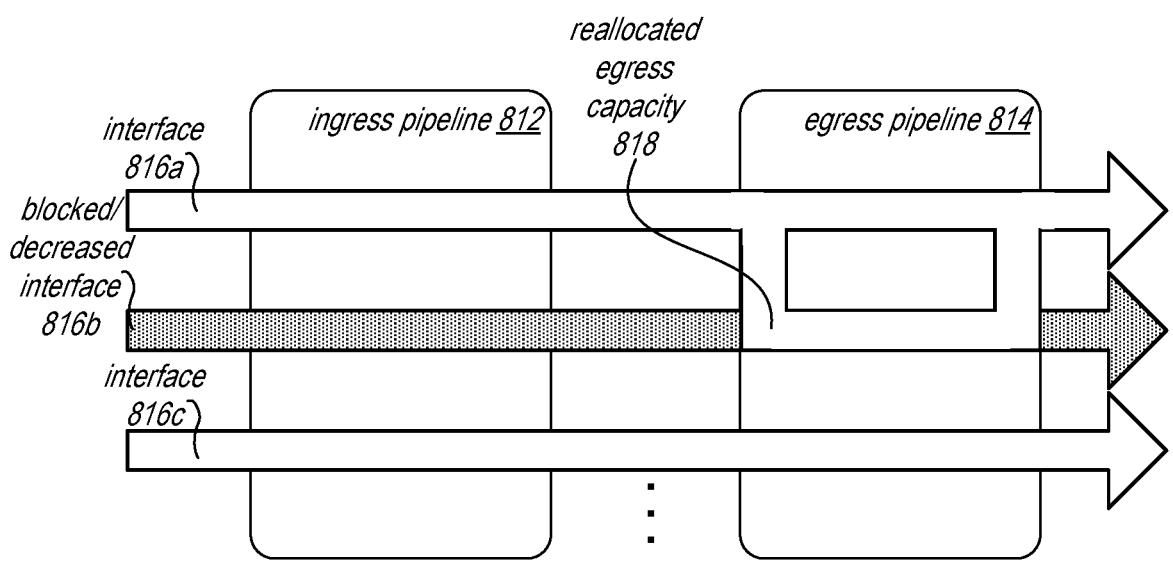

In some embodiments, adjustments to directional capacity are made utilizing features that can reallocate resources from one interface to another. FIG. 8A illustrates an example adjustment for a direction for interfaces 806a, 806b, and 806c across ingress pipeline 802 and 804 using reallocation. For example, to increase capacity to interface 806, ingress pipeline 802 may be modified to reallocate 808 ingress capacity from interface 806b (which may block or decrease network traffic from interface 806, in the ingress direction). For example, instead of pulling from the receiver queue evenly from interface 806a and 806b, every other "turn" (or all turns) of interface 806b may be given to interface 806a. In this way, traffic received via interface 806a may be placed into ingress pipeline 802 more frequently, increasing the directional capacity of interface 806a. FIG. 8B illustrates similar techniques for an egress direction, by making an example adjustment for a direction for interfaces 816a, 816b, and 816c across ingress pipeline 812 and 814 using reallocation. For example, to increase capacity to interface 816, egress pipeline 804 may be modified to reallocate 818 egress capacity from interface 806b (which may block or decrease network traffic from interface 806, in the egress direction).

The examples of dynamically modifying directional capacity of networking device interfaces as discussed above with regard to FIGS. 2-8B have been given in regard to a packet processor implemented as part of a networking device. Note that various other types or configurations of networking devices that implement packet processors or devices with multidirectional interfaces may implement these techniques. Moreover, different configurations of the various modules, components, or stages within a packet processor may implement dynamically modifying directional capacity of networking device interfaces. In addition to examples given above, the techniques discussed below with regard to FIGS. 9-12 may be also implemented using the various components discussed above as well as different types of systems or devices that perform packet processing.

Figure 9:
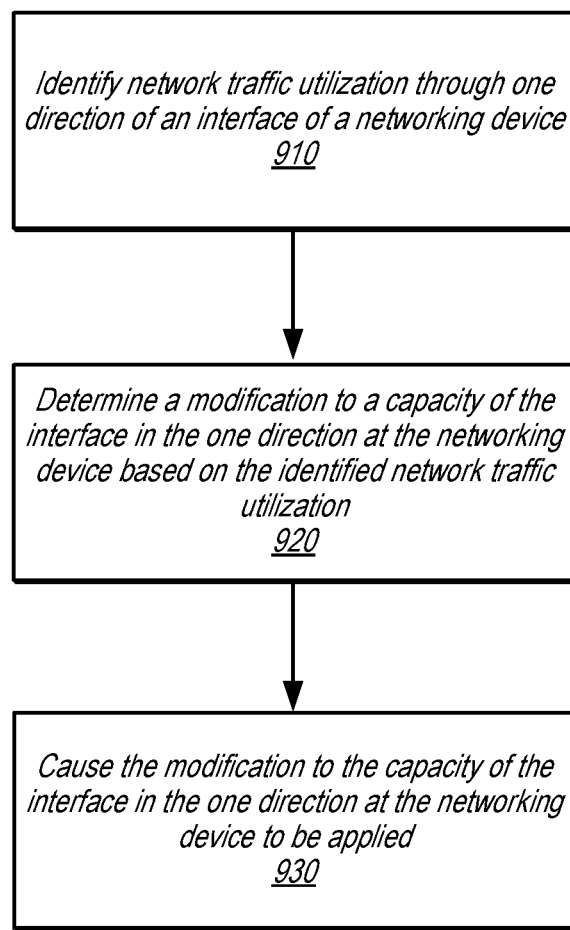
FIG. 9 is a high-level flowchart illustrating techniques for dynamically modifying directional capacity of networking device interfaces, according to some embodiments.

FIG. 9 is a high-level flowchart illustrating techniques for dynamically modifying directional capacity of networking device interfaces, according to some embodiments. As indicated at 910, a network traffic utilization through one direction of an interface of a networking device may be identified, in some embodiments. For instance, the network traffic utilization may be identified by a notification of a the network traffic sent from a source of the network traffic, sent either as part of a protocol that sends the network traffic through the interface of the network device or via a separate communication (e.g., an interface for network traffic manager 210 in FIG. 2). A file transfer protocol may notify a traffic manager similar to network traffic manager 210 in FIG. 2 that a file transfer is occurring. In another example, a flag, parameter, field, or other indicator may be included in network traffic visible to a networking device, such as a field value of a header in a link layer visible to traffic management 312 component in FIG. 3. Network traffic utilization through one direction may be identified through the collection, evaluation and other monitoring of utilization information, as discussed below with regard to FIGS. 10 and 11.

In some embodiments, identification of network traffic utilization may be performed in response to an interface request (e.g., submitted by an administrative application). The request may be implemented as part of various network management features that allow an administrator to explicitly configure changes in network traffic capacity at one or multiple devices. For instance, administrator might know that backups will egress over a certain specific port, and might configure that port permanently for asymmetric traffic. As noted in the previous example, some allocation changes may be permanently maintained (e.g., not subject to automated reversions to balanced or other allocations of directional capacity, as discussed below) until changed again by an administrator. This may allow an administrator, in some embodiments, to specify modifications to directional capacity to explicitly route certain types of traffic (e.g., based on traffic source, a promised/agreed quality of service, or other type indicator) using specially configured directional capacities.

The identified network traffic utilization may provide the basis for a modification to a capacity of the interface of the networking device in the one direction, in some embodiments, as indicated at 920. For example, the network traffic utilization may be at maximum existing capacity for the one direction (or above a threshold amount of utilization), which may indicate that an increase sufficient to bring the utilization below maximum (or below the threshold) may be determined. In some embodiments, a modification may be applied in an incremental or stepwise fashion, where a pre-defined modification amount to the capacity of the interface may be made (e.g., increasing direction capacity by 5 Gbps per modification) until the utilization is below maximum existing capacity (or below the threshold), and/or until the maximum/minimum adjustable capacity is reached where no further modifications can be made.

As indicated at 930, modification to the capacity of the interface in the one direction is caused to be applied, in various embodiments. For instance, a traffic manager (e.g., implemented at a networking device or in a separate server, host, or centralized system from the networking device) may send a request or instruction to modify the capacity to a specified amount. A controller for the networking device may receive the instruction and perform operations to configure the networking device to implement the modified capacity in the one direction (e.g., via the various techniques discussed above with regard to FIGS. 6-8B, and below with regard to FIG. 12). The modification to the interface may result in a modification to the communication link. However, the communication link capacity may be subject to the agreement and modification of another networking device interface connected to the networking device.

As discussed above with regard to FIGS. 1 and 2, centralized network traffic management techniques may utilize modifications to directional capacity for interfaces of networking devices. FIG. 10 is a high-level flowchart illustrating techniques for centralized monitoring and modification of directional capacity of networking device interfaces, according to some embodiments. As indicated at 1010, indications of network traffic utilization through directions of interfaces of networking devices in a network may be obtained. For example, network flow characteristics may be included in statistics collected for the performance of network traffic as the network traffic moves along a route, which may be used to characterize the route and utilization of the direction in which the route flows through various interfaces.

As indicated at 1020, an event to modify a route between networking devices in the network may be detected, in some embodiments. For instance, event criteria for increasing capacity, decreasing capacity, or to reverse or undo a modification may be evaluated with respect to the utilization of the directions of interfaces. Other criteria, such as flow duration, flow type, flow source, or a criteria specified by a monitoring policy or scheduled time period for modifying a route may be evaluated to. For instance, direction utilization for a scheduled high utilization route may be monitored to see if the actual utilization of directional capacity exceeds a threshold amount for making a modification. In this way, monitoring can be enabled and utilized in previously identified scenarios if the modification would be beneficial (as a request to modify directional capacity for a time period may be based on an erroneous demand forecast), in some embodiments. Monitoring for various criteria may continue if no event is detected (as indicated by the negative exit from 1020) or if a modification completes or is cancelled (not illustrated).

For a detected event, requests may be sent to modify capacity in one direction of an interface to the networking devices of the route, as indicated at 1030, in some embodiments. For example, an API command to perform a modification specifying a modification amount and a network connection direction may be generated and sent from a traffic manager to a networking device. In some embodiments, networking protocols such as Resource Reservation Protocol (RSVP) may be utilized to instruction to modify capacity in one direction of an interface at networking devices.

In some embodiments, different criteria for accepting or rejection instructions (or proposals as discussed in FIG. 11) may be applied by a networking device (e.g., by a controller). For example, a minimum amount of capacity may have to be maintained for each direction of an interface at a networking device. In some embodiments, this minimal amount may be dynamically determined by observed control traffic or other traffic that may need to utilize a direction. Other criteria may include time-based criteria, such as limiting directional capacity changes to certain windows of time in a 24 hour period. In some embodiments, one criteria may specify that an aggregate amount of directional traffic be maintained between two networking devices on two separate links, even if different interfaces have different directional capacity allocations on the respective links (e.g., two links where one link is 1/19 Gbps and the other link is 19/1 Gbps).

In at least some embodiments, a determination may be made if acknowledgements are received from the networking devices along the route to accept the modification request, as indicated at 1040. If, for instance, less than all networking devices accept the request, then as indicated at 1050 cancellation requests for the modification may be sent to the networking devices. In this way, modifications made to some networking devices along the route, but not others, does not lead to backpressure along the route, slowing down performance or increasing network traffic burdens on some networking devices. In some embodiments, a minimum number of a contiguous set of networking devices may accept the modification, causing the modification to be confirmed, as indicated by the positive exit from 1040. Confirmation of the modification may be sent to the network devices (e.g., via an API) which may cause the networking devices to perform the modification.

In some embodiments, all networking devices may have to acknowledge acceptance of the modification. In some embodiments, retry techniques may be attempted, sending additional requests to perform the modification, before sending cancellation (or confirmation).

In some embodiments, networking devices individually (or a centralized network management component) may monitor utilization of a network traffic through an interface with changed capacity. If the utilization does not make efficient use of the directional capacity change, (e.g., utilization is not greater than or equal to 80% of the changed directional capacity), then a change to the directional capacity to revert to the prior allocation or a more efficient allocation may be performed, in some embodiments.

As discussed above with regard to FIGS. 1 and 3, decentralized management techniques for modifying directional capacity of networking device interfaces may be implemented. FIG. 11 is a high-level flowchart illustrating techniques for decentralized monitoring and modification of directional capacity of networking device interfaces, according to some embodiments. As indicated at 1110, network traffic utilization for ingress and egress through interfaces at a controller of a networking device may be monitored. As discussed above with regard to FIGS. 9 and 10, various network flow characteristics, including a utilization measure or percentage of available ingress or egress bandwidth at interfaces at the networking device may be captured.

As indicated at 1120, an event to modify an ingress or egress through an interface may be detected, in some embodiments. For example, decrease criteria for an egress or ingress may be satisfied when utilization falls below a minimum threshold, in some embodiments. Various other combinations of event criteria may be considered. As indicated at 1130, for a detected event a proposal may be sent to modify a capacity of the opposite direction of a connected interface of another networking device, in some embodiments. For example, an event detected for egress via an interface may result in a proposal being sent to the other networking device that is connected to that interface, where the proposal modifies the opposite, ingress direction.

Responses from the other networking device (or no response) may be evaluated by the networking device. For example, if as indicated at 1140, the other networking device sends a response accepting the modification, then as indicated at 1142, a confirmation of the modification may be sent to the other networking device and a modification at the networking device may be instructed by a controller to perform the detected modification to the ingress or egress, as indicated at 1144. Alternatively, as indicated at 1150, the other networking device may send a response proposing a change to the modification (e.g., to increase or decrease the amount) or requesting a delay before resending the proposal (e.g., to allow for utilization at the recipient to change in order to accommodate the request). The other networking device may determine whether the change is acceptable, as indicated at 1152. For example, if the change is less than X % change from a current allocation, then the cost to perform the modification may not be deemed sufficient. In some embodiments, any proposed change may be accepted as an improvement (if less than intended) for the direction of the interface. For accepted changes, as indicated by the positive exit from 1152, a confirmation of the modification may be sent to the other networking device, as indicated at 1142, and a modification at the networking device may be instructed by a controller to perform the detected modification to the ingress or egress, as indicated at 1144. For rejected changes, a rejection of the change to the other networking device may be sent, as indicated at 1154, and the modification to the ingress or egress at the networking device may be cancelled, as indicated at 1162.

As indicated at 1160, a response may be received that rejects the modification, in some embodiments. In the event of a rejection, the modification to the ingress or egress at the networking device may be cancelled, as indicated at 1162. In the event that no response is received, a proposal timeout period may be enforced, as indicated at 1170. If the proposal has not timed out then future responses may be checked or waited for until the proposal does timeout (or a response is received). For a proposal that exceeds the timeout, the modification to the ingress or egress at the networking device may be cancelled, as indicated at 1162, in some embodiments.

Figure 12:
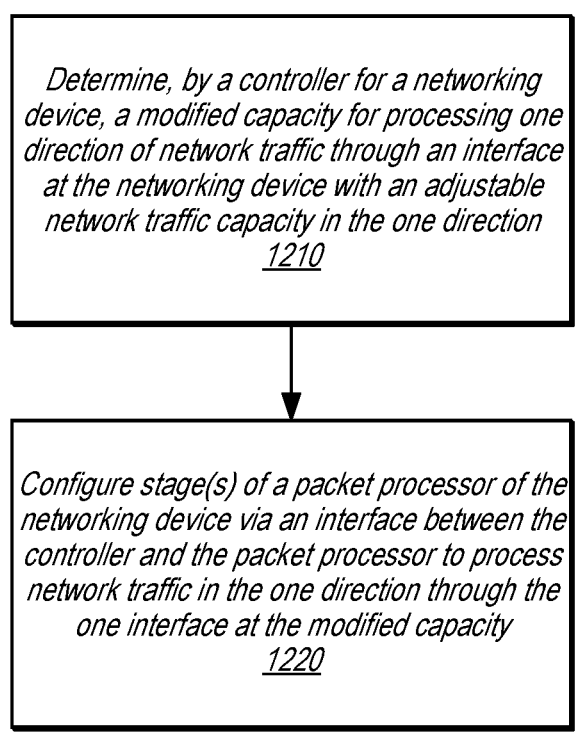
FIG. 12 is a high-level flowchart illustrating techniques for configuring a networking device with adjustable directional capacity for interfaces, according to some embodiments.

Networking device interfaces may be implemented with adjustable network traffic capacity, as discussed above in FIGS. 6-8B. A controller may select and/or utilize one or more of the various adjustable traffic capacity features in order to perform modifications to the directional capacity of an interface at a networking device. FIG. 12 is a high-level flowchart illustrating techniques for configuring a networking device with adjustable directional capacity for interfaces, according to some embodiments.

As indicated at 1210, a modified capacity for processing one direction of network traffic through an interface at a networking device with an adjustable network traffic capacity in the one direction may be determined. For example, various requests to perform a capacity modification (as discussed above with regard to FIGS. 2-3 and 9-11) may be received. Alternatively, the controller may detect modifications according utilization information determined for a direction of a network interface. Timers, or other triggers, such as networking device restarts, may cause a determination to modify the capacity for processing one direction of network traffic through an interface, in some embodiments.

As indicated at 1220, one or more stages of a packet processor of the networking device may be configured via an interface between the controller and the packet processor to process network traffic in the one direction through the one interface at the modified capacity. For example, a controller may utilize a controller interface to write, set, or otherwise modify control registers, memories, or other features of the packet processor to configure stages to change the direction of a communication medium (e.g., as is supported in an ingress/egress processing stage discussed in FIG. 6). In another example, a controller may write, set, or otherwise modify control registers, memories, or other features of the packet processor to block, throttle, or reduce the capacity of one network interface in order to make that capacity available to another interface. In some embodiments, a controller may write, set, or otherwise modify control registers, memories, or other features of the packet processor to utilize additional capacity features, such as increased clock frequency and/or additional stage bandwidth allowing for an increased network interface to utilize the additional stage bandwidth (while restricting network traffic from other interfaces) to this additional stage bandwidth.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

FIG. 13 is a block diagram illustrating a computer system that may implement at least a portion of the systems and techniques for direct storage loading for adding data to a database described herein, according to various embodiments. For example, computer system 2000 may implement a database engine head node of a database tier, or one of a plurality of storage nodes of a separate distributed storage system that stores databases and associated metadata on behalf of clients of the database tier, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 660, as desired, and may retrieve the stored instruction and/or data as needed. For example, in some embodiments, computer system 2000 may host a storage node, and persistent storage 2060 may include the SSDs attached to that server node.

Computer system 2000 includes one or more system memories 2020 that may store instructions and data accessible by processor(s) 2010. In various embodiments, system memories 2020 may be implemented using any suitable memory technology, (e.g., one or more of cache, static random-access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be implemented as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A networking device, comprising:
   at least one processor;
   a memory, storing program instructions that when executed by the at least one processor cause the at least one processor to implement a controller for the networking device;

a network interface configured to implement a network connection to the networking device; and a packet processor, comprising a plurality of stages to process network traffic for the interface;

wherein the controller is configured to:

determine an amount of modification to an ingress or egress capacity of the networking device for processing ingress or egress network traffic through the network interface; and modify a processing capacity of at least one of the stages of the packet processor, via an interface between the controller and the packet processor within the networking device, to modify the ingress or egress capacity of the networking device according to the determined amount to process ingress or egress network traffic through the network interface at the modified processing capacity.

2. The networking device of claim 1, wherein to modify the processing capacity of the at least one stage via the interface between the controller and the packet processor to modify the ingress or egress capacity according to the determined amount to process ingress or egress network traffic through the network interface at the modified processing capacity, the controller is configured to allocate at least a portion of unallocated processing capacity at the at least one stage to the network interface.

3. The networking device of claim 1, wherein the networking device further comprises a second network interface, and wherein to modify the processing capacity of the at least one stage via the interface between the controller and the packet processor to modify the ingress or egress capacity according to the determined amount to process ingress or egress network traffic through the network interface at the modified processing capacity, the controller is configured to reallocate at least a portion of the processing capacity from the second network interface to the network interface.

4. The networking device of claim 1, wherein to determine the amount of modification to the ingress or egress capacity for processing ingress or egress network traffic through the network interface, the controller is configured to:

monitor utilization for processing the ingress or egress network traffic through the network interface to detect a modification event; and wherein the amount of modification to the ingress or egress capacity is determined based on the detected modification event.

5. A method, comprising:

identifying, by a controller for a networking device, an amount of modification to an ingress or egress capacity of the networking device for processing ingress or egress network traffic through a network interface at the networking device with an adjustable ingress or egress network traffic capacity; and modifying processing capacity of one or more stages of a packet processor of the networking device via an interface between the controller and the packet processor within the networking device to modify the ingress or egress capacity of the networking device according to the determined amount to process ingress or egress network traffic through the one interface at the modified processing capacity.

6. The method of claim 5, wherein modifying the processing capacity of the one or more stages of the packet processor of the networking device via the interface between the controller and the packet processor comprises changing a direction of a communication channel in a physical layer of the one or more stages.

7. The method of claim 5, wherein modifying processing capacity of the one or more stages of the packet processor of the networking device via the interface between the controller and the packet processor comprises reallocating at least a portion of the processing capacity for a second network interface at the networking device to the network interface.

8. The method of claim 5, wherein modifying processing capacity of the one or more stages of the packet processor of the networking device via the interface between the controller and the packet processor comprises allocating at least a portion of unallocated processing capacity to the network interface.

9. The method of claim 8, wherein allocating the portion of unallocated processing capacity to the network interface comprises increasing a clock cycle for the one or more stages to create the unallocated capacity.

10. The method of claim 8, wherein allocating the portion of unallocated processing capacity to the network interface comprises enabling use of additional processing bandwidth at the at least one stage to create the unallocated processing capacity.

11. A system, comprising:

a packet processing device comprising;

a network interface configured to transmit and receive packets via a network connection to the packet processing device; and one or more stages to process ingress or egress network traffic of the network interface according to a capacity;

wherein the packet processing device is configured to:

apply a modification, received via an interface from a controller, to a processing capacity of at least one of the stages of the packet processor to modify an ingress or egress capacity of the packet processing device to process ingress or egress network traffic of the network interface according to the modified processing capacity; and process subsequent ingress or egress network traffic of the network interface through the modified at least one stage according to the modified processing capacity.

12. The system of claim 11, wherein to apply the modification to the processing capacity of at least one of the stages, the device is configured to change a direction of a communication channel in a physical layer of the at least one of the stages.

13. The system of claim 11, wherein the device further comprises a second network interface, and wherein to apply the modification to the processing capacity of at least one of the stages, the device is configured to reallocate at least a portion of the processing capacity for the second network interface to the network interface.

14. The system of claim 11, wherein to apply the modification to the processing capacity at least one of the stages, the device is configured to allocate at least a portion of unallocated processing capacity to the network interface.

15. The system of claim 14, wherein to allocate the portion of unallocated processing capacity to the network interface, the device is configured to increase a clock cycle for the at least one stage to create the unallocated capacity.

16. The system of claim 14, wherein to allocate the portion of unallocated processing capacity to the network interface, the device is configured to allow use of additional processing bandwidth at the at least one stage to create the unallocated processing capacity.

17. The system of claim 11, wherein the device is an application specific integrated circuit (ASIC), a system-on-chip (SoC), or a field-programmable gate array (FPGA).

18. The system of claim 11, wherein the network interface is an optical interface that transmits and receives packets as optical signals.

19. The system of claim 11, wherein at least one of the stages is a Media Access Control (MAC) stage, wherein at least another one of the stages are two or more Physical Coding Sub-layer (PCS) stages, wherein the MAC stage implements respective transmission queues and receiver queues for each of the PCS stages.

20. The system of claim 12, wherein the packet processing device comprises a plurality of network interfaces including the network interface, wherein the PCS stages are configured to receive packets from and send packets to each of the plurality of network interfaces.

\* \* \* \* \*